United States Patent
Honig et al.

(10) Patent No.: US 6,542,470 B1
(45) Date of Patent: Apr. 1, 2003

(54) PACKET EXPANSION WITH PRESERVATION OF ORIGINAL CYCLIC REDUNDANCY CODE CHECK INDICATION

(75) Inventors: Yoav Honig, Kfar Saba (IL); Ari Halpern, Petach Tikva (IL); Golan Schzukin, Tel Aviv (IL); Eytan Mann, Modiin (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/320,823

(22) Filed: May 26, 1999

(51) Int. Cl.7 .................. H04L 12/56; H04L 12/26; H03M 13/00
(52) U.S. Cl. .................. 370/242; 370/389; 714/758
(58) Field of Search .................. 370/252, 465, 370/467, 470, 472, 474; 714/744, 746, 752, 754, 758, 798

(56) References Cited

U.S. PATENT DOCUMENTS 5,594,702 A * 1/1997 Walkeman et al. .... 365/230.05
6,014,380 A * 1/2000 Hendel et al. ............... 370/392
6,034,963 A * 3/2000 Minami et al. .............. 370/401
6,128,666 A * 10/2000 Muller et al. ............... 709/238
6,172,990 B1 * 1/2001 Deb et al. ................... 370/474

* cited by examiner

Primary Examiner—Alpus H. Hsu
Assistant Examiner—Toan D. Nguyen
(74) Attorney, Agent, or Firm—Howard Zaretsky

(57) ABSTRACT

A system for appending data to a packet whereby the original CRC calculated by the transmitting station is not modified and is retained in order to determine the occurrence of transmission errors at the receiver. The invention is applicable in communication systems whereby the data to be appended to the packet comprises a fixed length. The invention appends the data in the form of a tag to the tail of the packet after the original CRC and, in addition, determines and appends a tag CRC to the tail of the packet following the tag data. The tag CRC has a value such that the CRC machine in the receiver generates a constant CRC value even though the packet length was increased. A tag CRC is generated that when appended to the packet produces the same result as if the packet was processed through the CRC machine without any data appended.

16 Claims, 4 Drawing Sheets

PACKET EXPANSION WITH PRESERVATION OF ORIGINAL CYCLIC REDUNDANCY CODE CHECK INDICATION

FIELD OF THE INVENTION

The present invention relates generally to data communications systems and more particularly relates to a system for expanding a packet's length while preserving its original CRC value.

BACKGROUND OF THE INVENTION

More and more reliance is being placed on data communication networks to carry increasing amounts of data. In a data communications network, data is transmitted from end to end in groups of bits called packets, frames, cells, messages, etc. depending on the type of data communication network. For example, Ethernet networks transport frames, X.25 and TCP/IP networks transport packets and ATM networks transport cells. Regardless of what the data unit is called, each data unit is defined as part of the complete message that the higher level software application desires to send from a source to a destination. Alternatively, the application may wish to send the data unit to multiple destinations.

In many communication systems it is desirable to add one or more data items to the received data packet. The data appended to the packet in some instances is referred to as a tag and may comprise various information elements such as the packet's priority, associated VLAN, etc.

A problem arises, however, when the packets are transmitted with a CRC check field. If data were to be added to the packet, either at the head or the tail, the CRC value becomes invalid. Changing the length of the packet by the addition of bits, invalidates the CRC. When the packet with the appended data passes through the CRC machine in the receiver, a CRC error indication will be generated since the CRC field in the original packet will not match that generated for the received packet. This is cause the original CRC was generated before the tag was appended to the packet. Thus, simple attachment of the tag to the packet will not work.

This problem is illustrated using the following example. A block diagram illustrating an example prior art interface card comprising a packet expander and MAC processor is shown in FIG. 1. The example is illustrated in the context of a communication system, generally referenced 10, that comprises a transmitter MAC processor 12, packet expander 14 and receiver MAC processor 16. Packets 18 generated by the transmitter MAC processor 12 comprise data and an original CRC field. Somewhere between the transmitter and the receive a tag 13 is appended to the packet by a packet expander 14. Ultimately the packets are received by the receiver MAC processor 16 that comprises a CRC machine. The CRC indication result of the CRC calculation will be an error indication since the original CRC does not consider the appended tag data. The output of the receiver MAC processor 16 comprises a packet 22 including data and some or all portions of the original CRC and the tag data.

Thus, as described above, the simple attachment of the tag data to the received packet is not a valid solution. One solution to this problem is to calculate the CRC anew with the appended tag data. This requires a CRC generator to calculate the new CRC value. In addition, calculating a new CRC wipes out any benefit of validating the original CRC to determine the occurrence of transmission errors after the received packet traveled over the communication link.

Another solution is to provide a custom MAC processor that has knowledge of the tag appended and is adapted to perform a CRC only on the original packet content before the tag was appended. Another solution is to provide circuitry that functions to strip out the tag from the packet and create two streams: the original packet and the stripped tag. The packet is then processed normally and a valid CRC indication results. After MAC processing the tag is re-appended to the packet. Both these solutions preserve the original CRC check sum but they required either special custom MAC processors or the creation of additional circuitry before and after the MAC processor. In addition, both cases do not provide for CRC error checking for the tag data itself.

SUMMARY OF THE INVENTION

The present invention is a system for appending data to a packet whereby the original CRC calculated by the transmitter station is not modified and is still utilized to determine the occurrence of transmission errors. The invention is applicable in any communication system whereby a data tag representing the data to be appended to the packet is a fixed length. The invention appends the data tag to the tail of the packet after the original CRC and, in addition, determines and appends a tag CRC to the tail of the packet after the tag data. The tag CRC having a value whereby the CRC machine in the receiver generates the constant CRC value even though the packet length was expanded.

The invention utilizes the principle of CRC generation that a constant CRC is generated when a packet with no errors including the original CRC are passed through the CRC machine in the receiver. A tag CRC is generated that when appended to the packet will produce the same result as if the packet was processed through the CRC machine without any data appended.

In accordance with the invention, all possible values of the tag data are passed through a CRC machine that has been initialized to the constant CRC value. The results are placed in a lookup table for use when appending the tag data to received packets. The lookup is performed every time tag data is to be appended to a packet. The advantage of the invention is that a new CRC result is not required to be generated for the expanded packet. In fact, it is not desirable to do so, as this would eliminate the benefit of using the original CRC that was received with the packet to detect transmission errors.

There is provided in accordance with the present invention an apparatus for appending a data tag to a packet having a data field and an original Cyclic Redundancy Check (CRC) field calculated by a transmitting station comprising a lookup table comprising a plurality of entries, each entry including a tag and a corresponding tag CRC, the tag CRC calculated to permit an appended packet to avoid generating a CRC error due solely to the lengthening of the packet and a tag processor operative to append the tag and the tag CRC to the tail of the packet following the original CRC field.

The apparatus further includes a tag CRC generator initialized with a constant CRC value and adapted to calculate a set of tag CRC values in response to all possible tag values input thereto. The apparatus further includes tag capture means adapted to separate and process the tag from the packet.

There is also provided in accordance with the present invention, in a packet transmission system, the packets having a data field and an original Cyclic Redundancy Check (CRC) field calculated by a transmitting station, a method of appending a data tag to a packet, the method comprising the steps of looking up a tag CRC in a tag CRC lookup table in accordance with a tag value, each entry in the CRC lookup table including a tag and a corresponding tag CRC, the tag CRC calculated to permit an appended packet to avoid generating a CRC error due solely to the lengthening of the packet and appending the tag data and the tag CRC to the tail of the packet following the original CRC.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ATM | Asynchronous Transfer Mode |
| I/F | Interface |
| IP | Internet Protocol |
| LUT | Lookup Table |
| MAC | Media Access Control |
| TCP | Transmission Control Protocol |
| VLAN | Virtual Local Area Network |
| VLT | VLAN Tag |

GENERAL DESCRIPTION

The present invention is a system for appending data to a packet whereby the original CRC calculated by the transmitter station is not modified and is still utilized to determine the occurrence of transmission errors. The invention is applicable in any communication system whereby a data tag representing the data to be appended to the packet is a fixed length. The invention appends the data tag to the tail of the packet after the original CRC and, in addition, determines and appends a tag CRC to the tail of the packet after the tag data. The tag CRC having a value whereby the CRC machine in the receiver generates the constant CRC value even though the packet length was expanded.

CRC Generators

Figure 1:
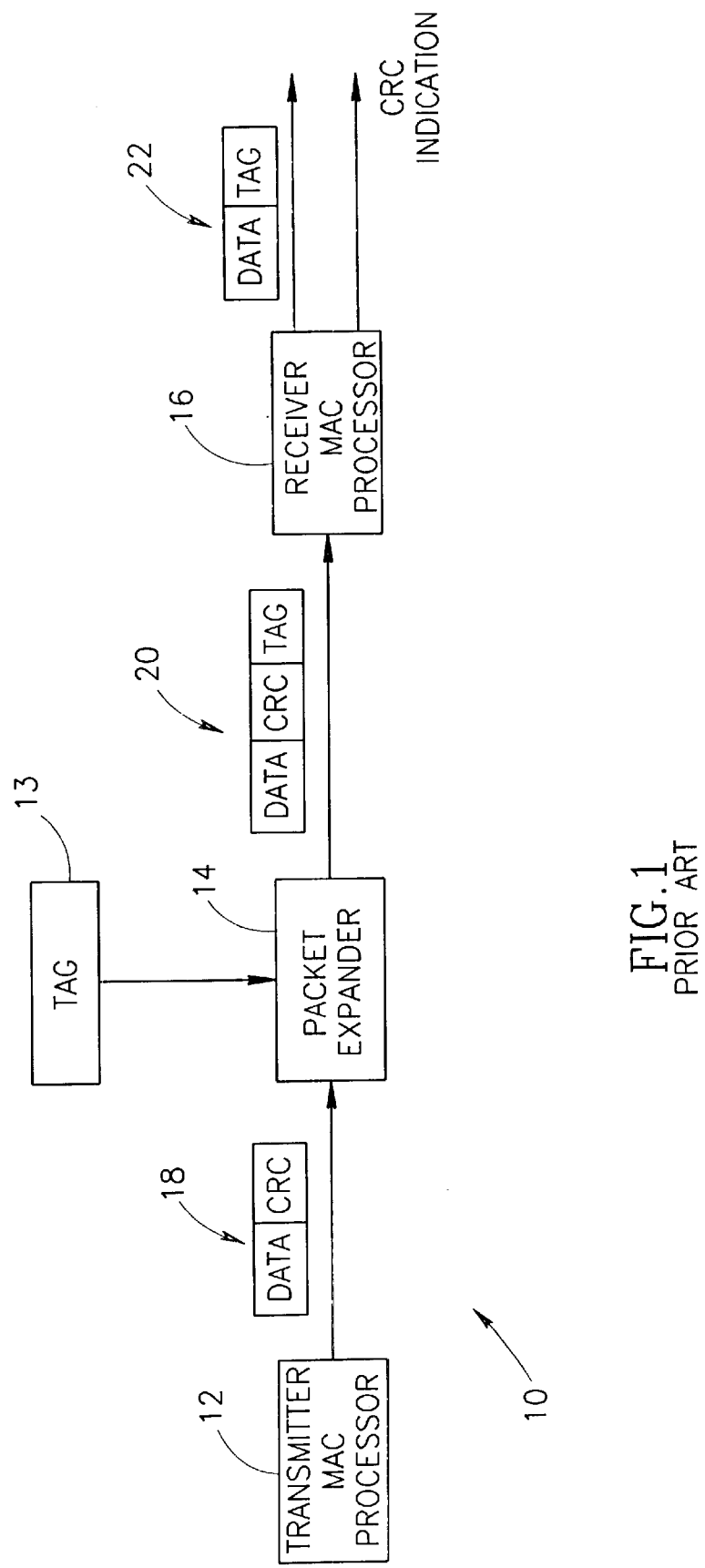
FIG. 1 is a block diagram illustrating an example prior art interface card comprising a packet expander and MAC processor.
Figure 2:
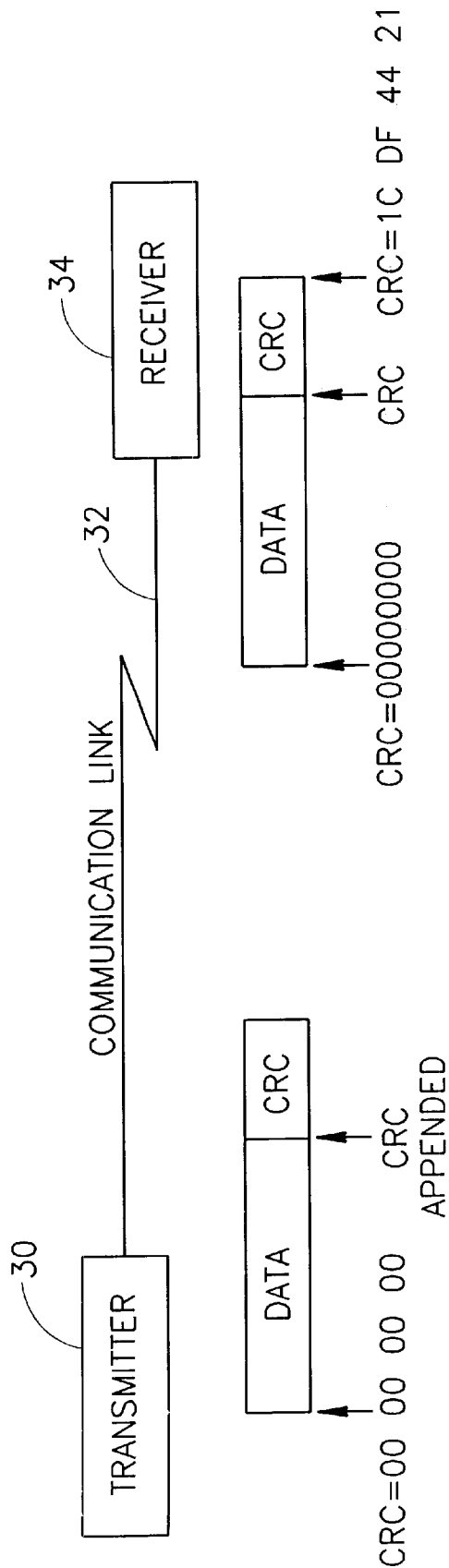
FIG. 2 is a diagram illustrating the generation and checking of the CRC in a transmitted data packet.

The present invention utilizes a well known property of CRC generators. A brief description of this property follows. In order to yield a valid Cyclic Redundancy Check (CRC) indication result, CRC machines always begin calculating a CRC check with an initial value of zero. After the packet (or other data item) has passed through the machine, the result is appended to the tail of the packet. This is shown schematically in FIG. 2. The transmitter 30 to packets to the receiver 34 over a communication link 32. The transmitter is operative to generate the CRC value and append it to the tail of the data packet.

When the receiver 34 receives the packet, it passes the packet without the received CRC through its own CRC machine in order to validate the CRC value. The CRC machine at he receiver is also initialized to zero before the packet is processed. After the packet has passed through the CRC machine, the result is compared to the CRC received, i.e., the CRC calculated by the transmitter. The receiver has knowledge of the transmitter CRC result as it was appended to the tail of the packet. If the two CRC values match, no error has occurred. If they do not match, an error occurred.

Alternatively, the CLC check can be performed in a slightly different manner based on the following principle: a CRC machine that receives as input a value equal to its current calculated value will always yield the same result. For 32 bit CRC machines, this result is the hex value 1C DF 44 21. The result is different for CRC machines of different widths. This phenomenon is the result of the division of the input by the CRC polynomial and is a well known property of CRC generators.

Thus, since the CRC value is located at the tail of the packet, the CRC value calculated by the CRC generator at the end of the data packet should be equal to the CRC value calculated by the transmitter. After the CRC machine processes the CRC value previously appended to the packet, the CRC result should be equal to 0x1CDF4421. A result other than this indicates an error has occurred.

Appending Packets

The system for appending, i.e., expanding, packets of the present invention is based on the principle of CRC generation described above. When the received packet and the CRC calculated by the transmitter is passed through the CRC machine in the receiver, a constant value is expected for the result of the CRC calculation, assuming no errors have occurred in transmission of the packet.

In accordance with the invention, the data that is to be appended to the packet is appended to the tail of the packet after the CRC value calculated by the transmitter. The data to be appended to the packet is referred to as a tag. The tag may be any data and any width. As will be described below, however, the tag is typically not very long, e.g., on the order of a byte or less.

In addition to the tag data, a tag CRC is generated and appended to the packet following the tag data. The tag CRC is a CRC that is generated in such a way that the CRC machine in the receiver will yield a CRC result of 0x1CDF4421 for the packet with the appended tag data and tag CRC. Note that the constant CRC value is different for CRC machines of different widths. The constant presented in the example above and throughout this document is for a CRC generator of width 32 bits. The principle, however, is the same regardless of the width of the CRC generator.

Figure 3:
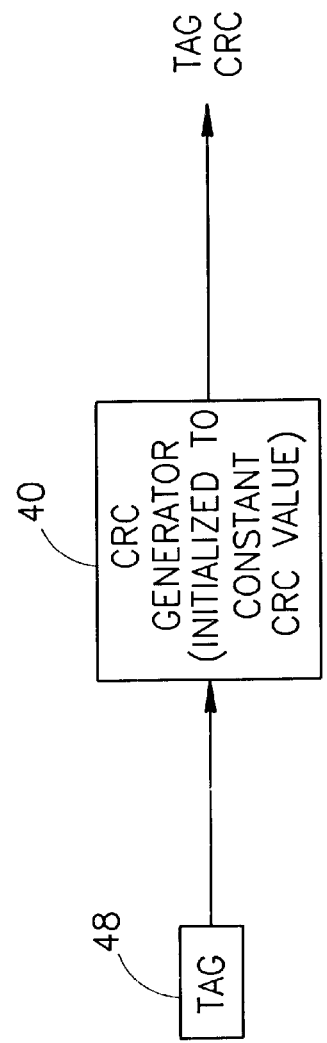
FIG. 3 is a block diagram illustrating the CRC generator of the present invention as used to generate tag CRC values.

A block diagram illustrating the CRC generator of the present invention used to generate tag CRC values is shown in FIG. 3. In accordance with the invention, the tag CRC values are generated a priori and stored in a lookup table. A tag CRC value is generated for all possible values of the tag data.

To generate the tag CRC values, the tag data 48 is generated and input to a standard CRC generator 40 of suitable width, e.g., 32 bits in this example. The CRC generator 40 is initialized to the CRC constant which equals 0x1CDF4421 for a 32 bit CRC. The desired tag data to be appended to the packet is then input to and ran through the CRC machine. The resulting CRC value calculated by the CRC generator is stored as the tag CRC associated with that particular tag data. The tag CRC, when appended to the tail of the packet, causes the CRC machine at the receiver to generate the constant CRC value of 0x1CDF4421, assuming there were no errors. In accordance with the invention, the tag CRC values for all possible tag data values are calculated a priori and a table is constructed with the tag data and corresponding tag CRC values.

In operation, tag data is first appended to the packet at the tail of the packet after the original CRC value. The CRC value is not modified in any way. A table lookup is then performed to determine the corresponding tag CRC for the tag data. The tag CRC is then appended to the packet after the tag data. The expanded packet is then processed normally.

When the packet is input to the CRC machine in the receiver, the original packet, original CRC, the tag data and tag CRC are processed by the CRC machine. If no errors occurred, the CRC calculation result in the CRC machine after the packet is processed, should be the constant CRC value of 0x1CDF4421 (for 32 bit CRCs).

Figure 4:
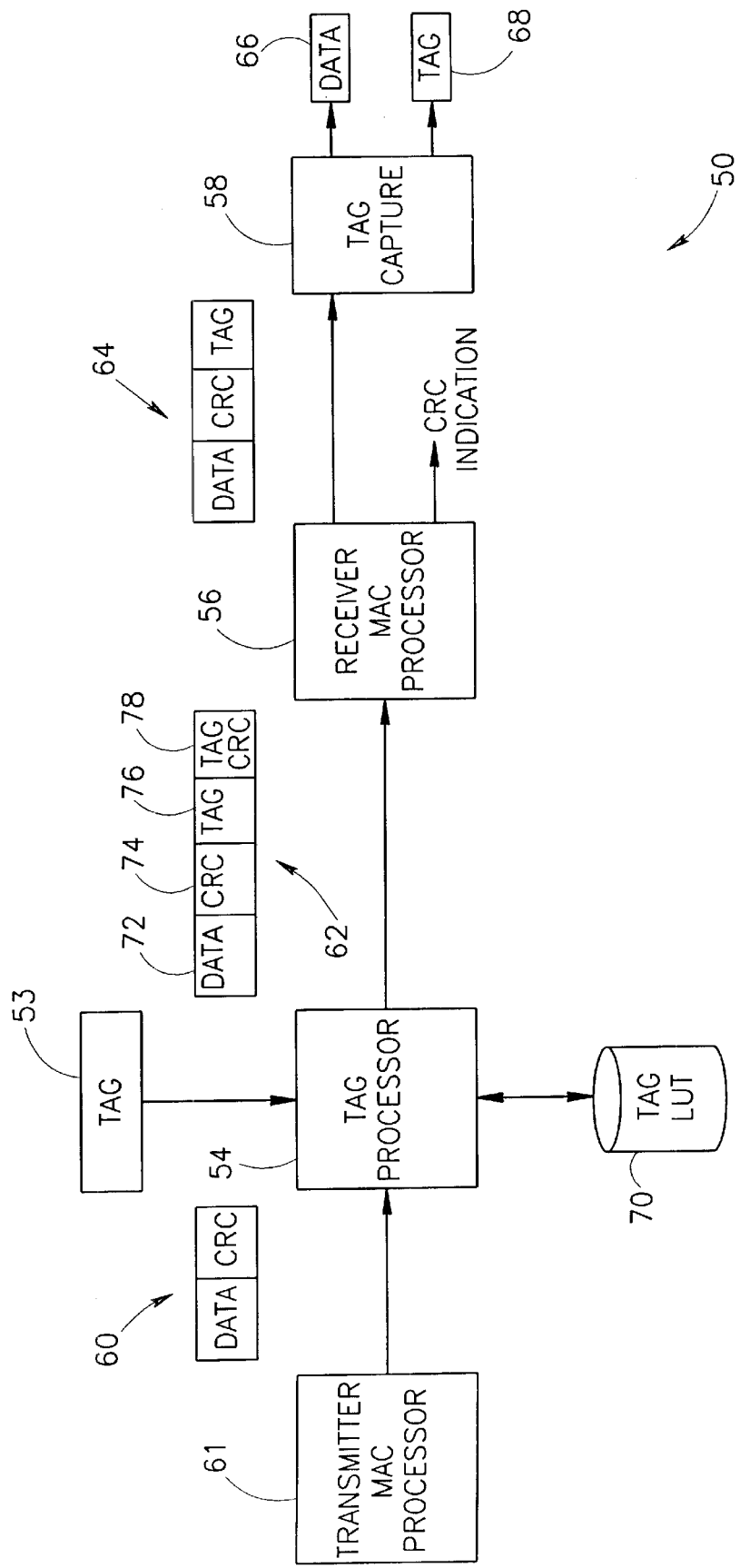
FIG. 4 is a block diagram illustrating the generation and appending of a tag CRC to the received data packet and its subsequent processing in an interface card.

A block diagram illustrating the generation and appending of a tag CRC to the received data packet and its subsequent processing in an interface card is shown in FIG. 4. To aid in understanding the invention, the packet expansion system of the present invention is illustrated in the context of a data communication system, generally referenced 50. One skilled in the art, however, can easily apply the principles of the present invention to other applications as well.

The data communications system, generally referenced 50, comprises a transmitter MAC processor 61, tag processor 54, receiver MAC processor 56, tag capture circuit 58 and tag lookup table (LUT) 70. In this example, packets are generated by the transmitter MAC processor 61. The packets 60 output comprise a data portion and a CRC portion.

At some point between the transmitter and the receiver a tag 53 is appended to the packet. In the example application illustrated in FIG. 4, somewhere between the transmitter and the receiver, the tag 53 is appended to the packet. In one embodiment, the tag is appended to the packet at the time the tag CRC is looked up and found in the tag LUT. Alternatively, the tag may be appended by an entity other than the tag processor at some earlier stage. In either case, the tag LUT 70 is searched for a tag CRC corresponding to the tag 53.

In this example, the tag data is applied for use as an indication of the VLAN associated with a packet. An example is illustrated below that is suitable for use with 4 bit tag data. The tag data this case preferred to as a VLAN tag or VLT. In actuality, the VLT is 8 bits with the upper nibble set to 0x00. The 16 possible VLAN tags are processed using the method and CRC machine described in connection with FIG. 3. The VLTs and their corresponding 32 bit tags CRC values are presented in Table 1 below.

TABLE 1

VLAN Tags and Corresponding Tag CRC Values

| VLAN Tag (Hex) | Tag CRC Value (Hex) |
| --- | --- |
| 00 | 00 00 00 00 |
| 01 | 04 C1 1D B7 |
| 02 | 09 82 3B 6E |
| 03 | 0D 43 26 D9 |
| 04 | 13 04 76 DC |
| 05 | 17 C5 6B 6B |
| 06 | 1A 86 4D B2 |
| 07 | 1E 47 50 05 |
| 08 | 26 08 ED B8 |
| 09 | 22 C9 F0 0F |
| 0A | 2F 8A D6 D6 |
| 0B | 2B 4B CB 61 |
| 0C | 35 0C 9B 64 |
| 0D | 31 CD 86 D3 |
| 0E | 3C 8E A0 0A |
| 0F | 38 4F BD BD |

Note that the value for tag data having other lengths can easily be generated using a standard CRC generator. The consultant CRC value will change, however, in accordance with the width of the CRC machine.

In operation, packets 60 enter the tag processor 54. The packets comprise a data portion and an original CRC value as calculated by the transmitter MAC processor 61. The output is input to the tag processor 54. The tag processor or another entity functions to append the tag 53 to the tail of the received packet. If another entity appends the tag to the packet, the tag processor functions to subsequently read the tag from the tail of the packet.

Note that it is important that the tag data and tag CRC be appended at the tail of the packet after the original CRC. This is because the CRC value calculated by CRC machine in the receiver MAC processor must be the constant CRC value for the tag to be processed without generating CRC errors.

The tag processor 54 performs a lookup on the tag data value using the tag LUT 70. The tag processor 54 retrieves the corresponding tag CRC from the tag LUT 70 and appends it to the tail of the packet after the tag data. Thus, the packet 62 output of the tag processor comprises the original data 72, original CRC value 74, tag data 76 and tag CRC 78.

The expanded packet is then input to the receiver MAC processor 56 or other packet processing circuitry. The receiver MAC processor comprises the receive CRC machine which performs a check of the received packet for errors in transmission. Once the tag and tag CRC are appended to the received packet, the CRC machine in the receiver MAC processor 56 will process the data, original CRC, the tag and tag CRC as normal input. If no errors occurred, the CRC indication output indicates no error and the packet 64 stripped of the tag CRC is output. Optionally, the packet is input to a subsequent processing stage, e.g., tag capture 58, where the tag is captured and stripped off. The output of the tag capture circuit 58 comprises the original data 66 stripped of the original CRC since it is not needed anymore and the tag data 68.

Note that if the receiver MAC processor is designed to expect packets of maximum length, then the use of the present invention may cause overflow errors due to lengthening by the tag data and tag CRC. In the example presented above, the packet is lengthened by 5 bytes (1 byte VLT and 4 byte tag CRC). In this case, the communication system must be adapted to ignore the overflow error indication.

Using the system of the present invention, a tag can be appended to the original packet while the original CRC is preserved and maintained for use as an indication of the occurrence of a packet error during transmission. In addition, the invention does not require the recalculation of the CRC as the CRCs are precalculated beforehand for all possible values of the tag data.

Figure 5:
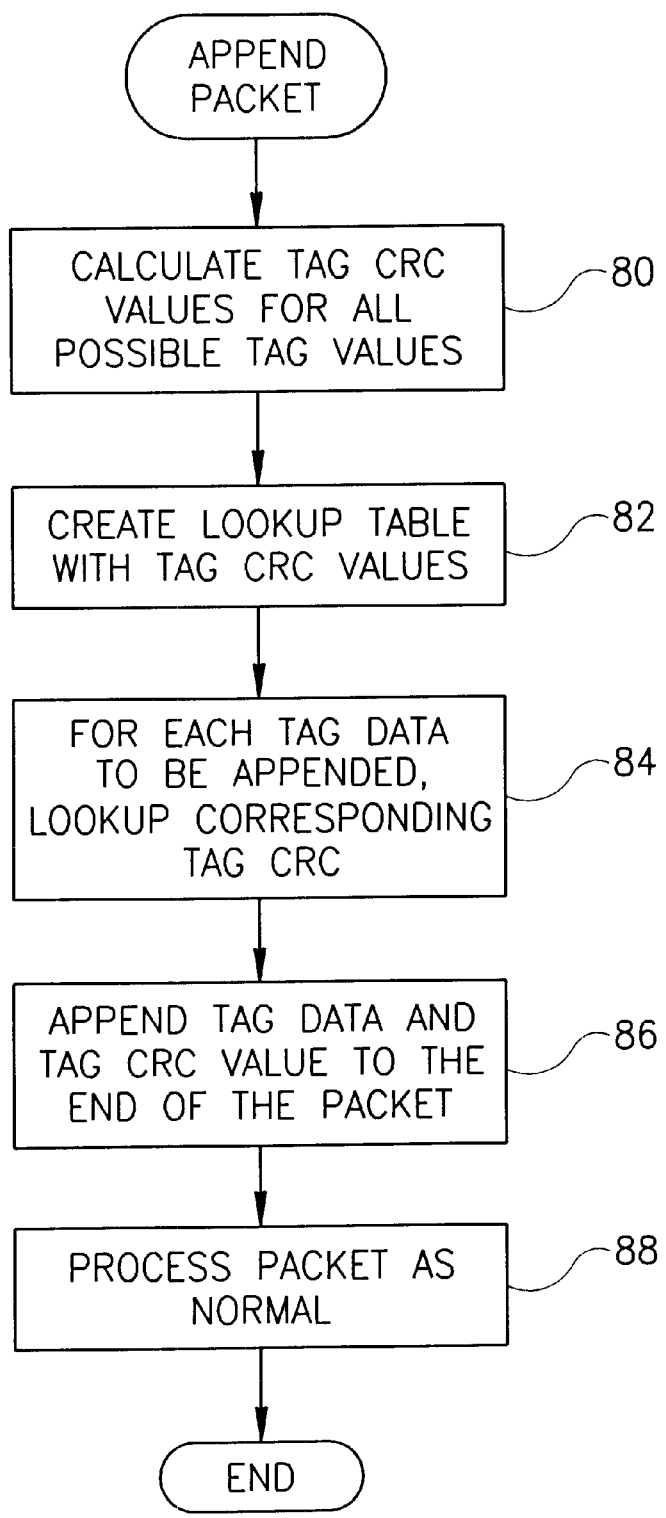
FIG. 5 is a flow diagram illustrating the append packet method of the present invention.

A flow diagram illustrating the append packet method of the present invention is shown in FIG. 5. Before packets can be processed, the possible values of the tag data must be determined and the corresponding tag CRC values are calculated (step 80). The lookup table is then created and the calculated tag CRC values are placed in the table (step 82).

During processing of the received packets, the tag CRC is found in the lookup table in accordance with the tag to be appended to the packet (step 84). The tag data and the tag CRC are then appended to the tail of the packet after the original CRC (step 86). The packet is then processed normally, i.e., passed through a CRC machine to check for transmission errors. If no errors occurred, the result of the CRC calculation will be the constant CRC value.

While the invention has been described with respect to a limited number of embodiments, it will be appreciated that many variations, modifications and other applications of the invention may be made.

What is claimed is:

1. An apparatus for appending a data tag to a packet having a data field and an original Cyclic Redundancy Check (CRC) field calculated by a transmitting station, comprising:

a lookup table comprising a plurality of entries, each entry including a tag and a corresponding tag CRC, said tag CRC calculated to permit an appended packet to avoid generating a CRC error due solely to the lengthening of said packet; and a tag processor operative to append said tag and said tag CRC to the tail of said packet following said original CRC field.

2. The apparatus according to claim 1, further comprising a tag CRC generator initialized with a constant CRC value and adapted to calculate a set of tag CRC values in response to all possible tag values input thereto.

3. The apparatus according to claim 1, further comprising tag capture means adapted to separate and process said tag from said packet.

4. The apparatus according to claim 1, wherein said tag CRC comprises a 32 bit value.

5. The apparatus according to claim 1, wherein said tag value comprises a 4 bit value.

6. In a packet transmission system, said packets having a data field and an original Cyclic Redundancy Check (CRC) field calculated by a transmitting station, a method of appending a data tag to a packet, said method comprising the steps of:

looking up a tag CRC in a tag CRC lookup table in accordance with a tag value, each entry in said CRC lookup table including a tag and a corresponding tag CRC, said tag CRC calculated to permit an appended packet to avoid generating a CRC error due solely to the lengthening of said packet; and appending said tag data and said tag CRC to the tail of said packet following said original CRC.

7. The method according to claim 6, further comprising the step of generating said lookup table by initializing a CRC generator to a constant CRC value, inputting each possible tag value thereto and storing the resultant CRC values in said lookup table.

8. The method according to claim 6, wherein said tag CRC value comprises a 32 bit value.

9. The method according to claim 6, further comprising the step of processing said packet through a CRC machine after appending said packet with said tag and said tag CRC values.

10. The method according to claim 6, further comprising the step of capturing said appended packet and separating said data field from said tag field.

11. The method according to claim 6, wherein said tag value comprises a 4 bit value.

12. A method of appending a fixed length data tag to a packet having an original Cyclic Redundancy Check (CRC) field, said method comprising the steps of:

calculating a priori tag CRC values corresponding to all possible values of said data tag, each tag CRC calculated so as to permit an appended packet to avoid generating a CRC error due solely to the lengthening of said packet;

selecting a tag CRC value from said previously calculated tag CRC values according to a data tag to be appended to said packet; and appending said data tag and said tag CRC to the tail of said packet following said original CRC field.

13. The method according to claim 12, wherein said step of calculating further comprises storing said calculated tag CRC values in a look up table.

14. The method according to claim 12, wherein said tag CRCs are calculated so as to cause a CRC machine in a receiver to generate a constant CRC value if a packet is received without error.

15. The method according to claim 14, wherein constant CRC value equals the Hex value 0x1CDF4421 for a 32 bit wide CRC calculation.

16. The method according to claim 12, said step of selecting comprises the step of looking up said tag CRC value in a lookup table adapted to store said previously calculated tag CRC values.

* * * * *